(12) United States Patent
Tan et al.

(10) Patent No.: US 9,095,031 B2
(45) Date of Patent: Jul. 28, 2015

(54) ORGANIC LIGHT EMITTING DIODE DRIVING CIRCUIT, DISPLAY PANEL, DISPLAY AND DRIVING METHOD

(71) Applicants: BOE TECHNOLOGY GROUP CO., LTD., Beijing (CN); CHENGDU BOE OPTOELECTRONICS TECHNOLOGY CO., LTD., Sichuan (CN)

(72) Inventors: Wen Tan, Beijing (CN); Xiaojing Qi, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

(*) Notice: Subject to any disclaimer, the term of this patent is extended or adjusted under 35 U.S.C. 154(b) by 261 days.

(21) Appl. No.: 13/704,690

(22) PCT Filed: Oct. 17, 2012

(86) PCT No.: PCT/CN2012/083105
§ 371 (c)(1),
(2) Date: Dec. 17, 2012

(87) PCT Pub. No.: WO2013/064016
PCT Pub. Date: May 10, 2013

(65) Prior Publication Data
US 2013/0106307 A1    May 2, 2013

(30) Foreign Application Priority Data
Nov. 1, 2011  (CN) .......................... 2011 1 0340563

(51) Int. Cl.
*G09G 3/10* (2006.01)
*G09G 3/30* (2006.01)
(Continued)

(52) U.S. Cl.
CPC .......... *H05B 33/0896* (2013.01); *G09G 3/3225* (2013.01); *G09G 2300/0861* (2013.01); *G09G 2320/0233* (2013.01); *G09G 2320/045* (2013.01)

(58) Field of Classification Search
CPC ................... G09G 3/3225; G09G 2300/0861; G09G 2320/045; G09G 2320/0233
USPC ........ 315/169.3, 291; 345/76–77, 82, 84, 690
See application file for complete search history.

(56) References Cited

U.S. PATENT DOCUMENTS 6,919,871 B2 * 7/2005 Kwon .............................. 345/92
7,646,366 B2 * 1/2010 Ha et al. ........................... 345/82
(Continued)

FOREIGN PATENT DOCUMENTS

| CN | 1924983 A | 3/2007 |
|---|---|---|
| CN | 101136174 A | 3/2008 |

(Continued)

OTHER PUBLICATIONS

International Preliminary Report on Patentability Issued May 6, 2014 Appln. No. PCT/CN2012-083105.
(Continued)

*Primary Examiner* — Kenneth Wells
(74) *Attorney, Agent, or Firm* — Ladas & Parry LLP

(57) ABSTRACT

The disclosed technical solution relates to an organic light emitting diode driving circuit, and a display panel, a display and a driving method using the same. The organic light emitting diode driving circuit includes a driving unit, a threshold compensation unit and an organic light emitting diode. The preferred threshold compensation unit comprises 5 transistors and a capacitance. The organic light emitting diode driving circuit compensates the threshold voltage Vth of the driving transistor by means of this 6T1C circuit, eliminates the inconsistent operation states of the organic light emitting diode caused by the different threshold voltages of the driving transistor in the entire circuit, thereby solving the problem regarding the brightness and evenness of the organic light emitting diode.

11 Claims, 1 Drawing Sheet

(51) Int. Cl.
*H05B 33/08* (2006.01)
*G09G 3/32* (2006.01)

(56) References Cited

U.S. PATENT DOCUMENTS

| | | | |
|---|---|---|---|
| 7,859,491 B2 * | 12/2010 | Lee et al. | 345/76 |
| 7,872,620 B2 * | 1/2011 | Han et al. | 345/82 |
| 8,477,085 B2 * | 7/2013 | Shishido | 345/76 |
| 8,502,754 B2 * | 8/2013 | Lin | 345/82 |
| 2006/0256057 A1 | 11/2006 | Han et al. | |
| 2010/0001983 A1 | 1/2010 | Abe | |
| 2011/0210990 A1 | 9/2011 | Kim et al. | |

FOREIGN PATENT DOCUMENTS

| | | |
|---|---|---|
| CN | 101563720 A | 10/2009 |
| CN | 102651197 A | 8/2012 |
| KR | 100658631 B1 | 12/2006 |
| KR | 20070070544 A | 7/2007 |

OTHER PUBLICATIONS

First Chinese Office Action dated Dec. 4, 2013; Appln. No. 201110340563.1.
Chinese Rejection Decision dated Jul. 10, 2014; Appln. No. 201110340563.1.
International Search Report; dated Jan. 11, 2011; PCT/CN2012/083105.
Chinese Reexamination Notice dated May 7, 2015; Appln. No. 201110340563.1.

* cited by examiner

ORGANIC LIGHT EMITTING DIODE DRIVING CIRCUIT, DISPLAY PANEL, DISPLAY AND DRIVING METHOD

BACKGROUND

The disclosed technical solution relates to an organic light emitting diode driving circuit and an organic light emitting diode driving method.

The operation state of the organic light emitting diode directly affects the evenness and brightness thereof. The organic light emitting diode is a current-controlled element and current generated in the thin film transistor in a saturated state is widely used in present to drive. Due to a limitation of the manufacture process, especially the bad evenness and the shift of the threshold voltage Vth of the transistor produced through low temperature polycrystalline silicon technique, different driving currents will be produced when voltages of a same grey scale are input. The inconsistent driving currents render the operation state of the organic light emitting diode unstable, which is a main reason for which the brightness evenness of the traditional 2T1C circuit is always bad.

SUMMARY

In order to overcome the defects described above, the disclosed technical solution provides a driving circuit, a display panel, a display and a driving method for the organic light emitting diode which result in a good brightness and evenness of the organic light emitting diode.

For achieving the above purpose, according to an aspect of the disclosed technical solution, there is provided an organic light emitting diode driving circuit comprising an organic light emitting diode, a driving unit controlling a current of the organic light emitting diode and a threshold compensation unit, said threshold compensation unit comprising:

a first electronic switch with a first connection terminal thereof being connected to a cathode of the organic light emitting diode, a second connection terminal thereof being connected to the driving unit and a switch control terminal thereof being connected to a second control voltage;

a second electronic switch with a first connection terminal thereof being connected to a high level, a second connection terminal thereof being connected to a first connection terminal of a third electronic switch, and a switch control terminal thereof being connected to a first control voltage;

the third electronic switch with a first connection terminal thereof being connected to the second connection terminal of the second electronic switch, a second connection terminal thereof being connected to a capacitance, and a switch control terminal thereof being connected to a scan line;

a fourth electronic switch with a first connection terminal thereof being connected to the driving unit, a second connection terminal thereof being connected to a data line, and a switch control terminal thereof being connected to the scan line;

a fifth electronic switch with a first connection terminal thereof being connected to ground, a second connection terminal thereof being connected to the driving unit, and a switch control terminal thereof being connected to the second control voltage; and the capacitance with a terminal thereof being connected to ground, and the other terminal thereof being connected to the second connection terminal of the third electronic switch, wherein an anode of the organic light emitting diode is connected to the high level, and the second connection terminal of the second electronic switch is connected to the second connection terminal of the first electronic switch.

In specific, the driving unit is a driving transistor, a control terminal of the driving transistor is connected to the second connection terminal of the third electronic switch, and the two controlled terminals of the driving transistor are connected to the second connection terminal of the fifth electronic switch and the second connection terminal of the first electronic switch respectively.

In specific, one or more of the first electronic switch, the second electronic switch, the third electronic switch, the fourth electronic switch and the fifth electronic switch is an N-type thin film transistor.

In specific, the driving transistor is an N-type thin film transistor.

An active organic light emitting diode display panel comprising the organic light emitting diode driving circuit described above is provided also.

An active organic light emitting diode display comprising the organic light emitting diode display panel described above is provided also.

Another aspect of the disclosed technical solution provides an organic light emitting diode driving method for using the circuit described above, comprising the steps of:

in a pre-charge phase, the third and the fourth electronic switches being turned on in response to a valid level of the scan voltage, the second electronic switch being turned on in response to the valid voltage of the first control voltage, the first and the fifth electronic switches being turned off in response to a invalid voltage of the second control voltage, and the terminal of the capacitance connected to the third switch transistor being charged to a high level;

in a data writing and discharging compensation phase, the third and the fourth electronic switches being turned on in response to the valid level of the scan voltage, the second electronic switch being turned off in response to a invalid voltage of the first control voltage, the first and the fifth electronic switches being turned off in response to the invalid voltage of the second control voltage, and the capacitance discharging to a valid level value of the data voltage through the driving unit;

in a switch-buffering phase, the third and the fourth electronic switches being turned off in response to a invalid level of the scan voltage, the second electronic switch being turned off in response to a invalid voltage of the first control voltage, and the first and the fifth electronic switches being turned off in response to a invalid voltage of the second control voltage; and in a driving phase for the organic light emitting diode, the first and the fifth electronic switches being turned on in response to a valid voltage of the second control voltage, the third and the fourth electronic switches being turned off in response to a invalid level of the scan voltage, the second electronic switch being turned off in response to a invalid voltage of the first control voltage, a driving current of the driving unit flowing through the organic light emitting diode to cause it to emit light.

DETAILED DESCRIPTION OF THE PREFERRED EMBODIMENTS

The present invention is described in detail below in combination with the accompany figures and the embodiments.

According to an embodiment of the disclosed technical solution, the driving circuit for the organic light emitting diode uses a diode connection method and discharges to form a threshold voltage Vth. That is, the threshold for the driving unit of the organic light emitting diode is compensated by means of the threshold compensation principle so as to eliminate the inconsistent operation states of the organic light emitting diode caused by the different threshold voltages of the driving unit in the entire circuit, thereby solving the problem of the brightness attenuation and unevenness of the organic light emitting diode. The driving circuit used therein includes a driving unit, a threshold compensation unit and an organic light emitting diode. A plurality of connection terminals of the threshold compensation unit are connected to a data line, a scan line, a control voltage, high level $V_{DD}$, the organic light emitting diode and the driving unit, respectively.

In present embodiment, the threshold compensation unit of the driving circuit for the organic light emitting diode is consists of five electronic switches and one capacitance, and the driving unit is a driving transistor. For improving the whole operating performance, the N-type thin film transistor is preferably chosen for the electronic switches and the driving transistor, which are collectivity referred to as a 6T1C circuit. The threshold compensation unit of the driving circuit compensates the threshold voltage Vth of the driving transistor so that the current of the driving transistor is independent of the threshold voltage Vth and thus a target of improving the consistence and evenness of the current of the organic light emitting diode is achieved. The phenomenon that the operating states of the organic light emitting diode are inconsistent due to the different threshold voltages of the driving transistors in the whole circuit is eliminated, thereby solving the problem of attenuation and bad evenness of the brightness of the organic light emitting diode.

Figure 1:
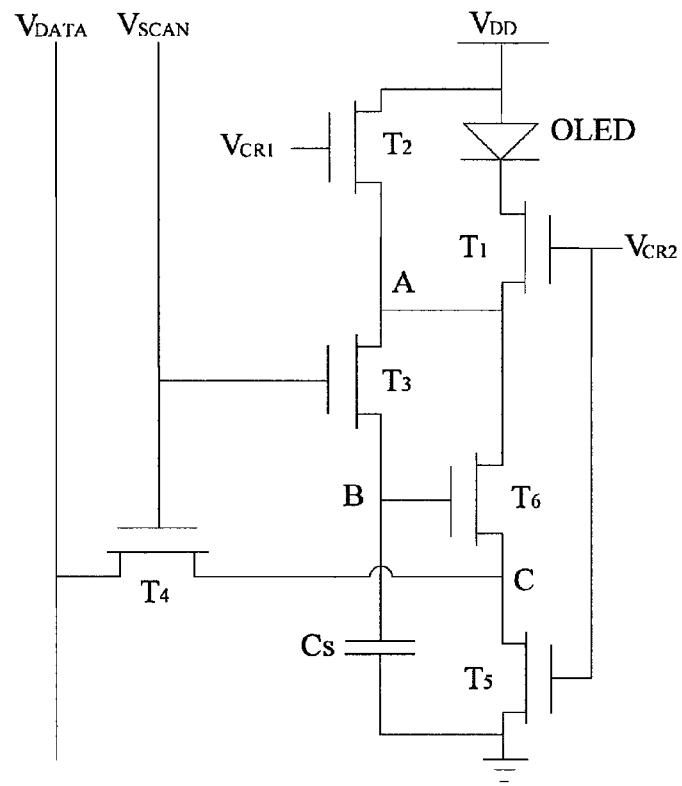
FIG. 1 is a principle diagram of a first preferable embodiment of a driving circuit for an organic light emitting diode according to the disclosed technical solution.

Preferred embodiment: as shown in FIG. 1, a first preferable threshold compensation unit of the organic light emitting diode according to the disclosed technical solution comprises:

A first switch transistor $T_1$: a source and a drain thereof are connected to a cathode of the light emitting diode and a driving transistor $T_6$, respectively, and a gate thereof is connected to a second control voltage $V_{CR2}$;

A second switch transistor $T_2$: a drain thereof is connected to a high level $V_{DD}$, a source thereof is connected to a first connection terminal of a third electronic switch, and a gate thereof is connected to a first control voltage $V_{CR1}$;

A third switch transistor $T_3$: a first connection terminal thereof (point A) is connected to a second connection terminal of the second electronic switch, and a second connection terminal thereof (point B) is connected to a capacitance and a gate thereof is connected to a scan line $V_{SCAN}$;

A fourth switch transistor $T_4$: a source and a drain thereof are connected to the driving transistor $T_6$ and a data line $V_{DATA}$, respectively, and a gate thereof is connected to the scan line $V_{SCAN}$;

A fifth switch transistor $T_5$: a source thereof is grounded, a drain thereof is connected to the driving transistor $T_6$ and a gate thereof is connected to the second control voltage $V_{CR2}$; and A capacitance $C_S$: a terminal thereof is grounded and the other terminal thereof is connected to the second connection terminal of the third switch transistor $T_3$.

Wherein, $V_{CR1}$, $V_{CR2}$ and $V_{DD}$ are output voltages provided by an integrated circuit or generated by a gate driving array circuit dedicated to the low temperature polycrystalline silicon technique.

An anode of the organic light emitting diode OLED is connected to the high level $V_{DD}$, and a cathode thereof is connected to the first switch transistor $T_1$. A gate of the driving transistor $T_6$ is connected to the terminal B of the third switch transistor, a source C thereof is connected to the fifth switch transistor $T_5$ and a drain thereof is connected to the first switch transistor $T_1$.

In order to improve the operation performance and the integration degree of the whole circuit, all of the first switch transistor $T_1$, the second switch transistor $T_2$, the third switch transistor $T_3$, the fourth switch transistor $T_4$, the fifth switch transistor $T_5$ and the driving transistor $T_6$ employ N-type thin film transistors.

An up emission manner is employed for the organic light emitting diode in the preferable embodiment of the disclosed technical solution. $V_{GS}$ of the driving transistor depends on only $V_{DATA}$ and will not be affected by the threshold voltage of the organic light emitting diode, which means that the driving current will not be affected by the variations of the threshold voltage of the organic light emitting diode, thereby avoiding the variations of the driving current generated as the threshold voltage of the organic light emitting diode shifts.

Figure 2:
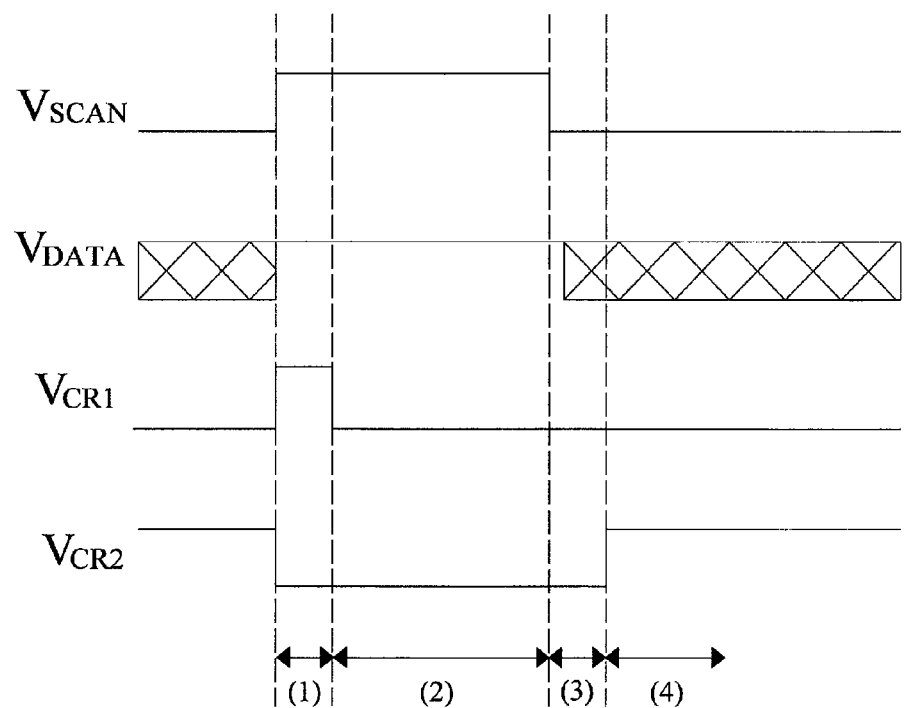
FIG. 2 is a driving timing chart of the driving circuit shown in FIG. 1.

As shown in FIG. 2, a driving method for a preferable embodiment of a driving circuit of the organic light emitting diode in the disclosed technical solution comprises the steps of:

1. A pre-charge phase: phase (1) as shown in FIG. 2, wherein $V_{SCAN}$ and $V_{CR1}$ are high levels, and $V_{CR2}$ is a low level. Transistors $T_2$, $T_3$ and $T_4$ are turned on and transistors $T_1$ and $T_5$ are turned off. The two terminals of the storage capacitance $C_S$ are connected to $V_{DD}$ and ground, that is, terminal B of the third switch transistor $T_3$ is charged to be close to $V_{DD}$.

2. A data writing and discharging compensation phase: phase (2) as shown in FIG. 2, wherein $V_{SCAN}$ is the high level, and $V_{CR1}$ and $V_{CR2}$ are low levels. Transistors $T_3$ and $T_4$ are turned on, transistors $T_1$, $T_2$ and $T_5$ are turned off, and the gate and the drain of the driving transistor $T_6$ are connected with each other, and thus the driving transistor $T_6$ operates equivalently to a diode. The two terminals of the storage capacitance $C_S$ are connected to the gate of the driving transistor $T_6$ and ground, respectively, while source point C of the driving transistor $T_6$ is connected to the $V_{DATA}$ line.

In this phase, $V_{GS}$ of the transistor $T_6$, that is, the voltage of points B and C (as shown in FIG. 1) is initially at $V_{DD}$-$V_{DATA}$, and the transistor $T_6$ turns on. $C_S$ discharges to $V_{DATA}$ through the transistor $T_6$, the voltage of $C_S$ gradually decreases, that is, $V_{GS}$ of the transistor $T_6$ gradually reduces until reaching the threshold voltage of the transistor $T_6$. At this time, the transistor $T_6$ enters a sub-threshold-on state and turns off, $C_S$ stops discharging through $T_6$ and the voltage across $C_S$ is held at $V_{DATA}$+$V_{GS}(T_6)$, that is $V_{DATA}$+Vth. Due to the voltage-holding function of $C_S$ and the other terminal of $C_S$ being grounded, the gate potential of T6is at $V_{DATA}$+Vth at that time.

3. A switch-buffering phase: phase (3) as shown in FIG. 2, wherein $V_{SCAN}$, $V_{CR1}$ and $V_{CR2}$ are high levels. The transistors $T_1$, $T_2$, $T_3$, $T_4$ and $T_5$ are turned off and the gate level of the driving transistor $T_6$ is stabilized at $V_{DATA}$+Vth by the storage capacitance $C_S$.

4. A driving phase for organic light emitting diode: phase (4) as shown in FIG. 2, wherein $V_{CR2}$ is the high level, and $V_{SCAN}$ and $V_{CR1}$ are low levels. The transistors $T_1$ and $T_5$ are turned on and the transistors $T_2$, $T_3$ and $T_4$ are turned off. The driving transistor $T_6$ works in a saturated area and the driving current flows through the organic light emitting diode to cause the diode to emit light.

$C_S$ causes the gate level of the driving transistor $T_6$ to be at $V_{DATA}$+Vth. The source of the driving transistor $T_6$ is connected to ground through transistor $T_5$ which is turned on, that is, the gate-source voltage $V_{GS}$ of the driving transistor T6 is $V_{GS}=V_{DATA}+Vth-V_{GND}=V_{DATA}+Vth$.

Accordingly, the saturated current value $I_{DS}$ of FET is $I_{DS}=k(V_{GS}-Vth)^2=k(V_{DATA}+Vth-Vth)^2$, that is, the threshold voltage Vth of the driving transistor $T_6$ in the driving current value is eliminated and the variations of the current value will not be affected by the shift of the threshold voltage of the driving transistor $T_6$ any more.

This phase is a light emitting phase for the organic light emitting diode and it will continue to emit light until the next frame of data is written in.

The grid area of $V_{DATA}$ in FIG. 2 represents an invalid signal.

According to an aspect of the disclosed technical solution, an active organic light emitting diode display panel comprising the driving circuit for the organic light emitting diode described above is provided.

According to another aspect of the disclosed technical solution, an active organic light emitting diode display comprising the organic light emitting diode display panel described above is provided. The use of the driving circuit for the organic light emitting diode of present invention results a better performance of the active organic light emitting diode display panel and thus the problems relating to attenuation and unevenness of the brightness or the like are effectively solved.

Those described above are only the preferable embodiments of the present invention and the protection scope of the present invention is not limited thereto. Any variation or alternation which is readily conceived by those skilled in the art in the technical scope disclosed by present invention should fall into the protection scope of the present invention. Therefore, the protection scope of the present invention should be determined by the claims.

What is claimed is:

1. An organic light emitting diode driving circuit comprising an organic light emitting diode, a driving unit controlling a current of the organic light emitting diode and a threshold compensation unit comprising:
   a first electronic switch with a first connection terminal thereof being connected to a cathode of the organic light emitting diode, a second connection terminal thereof being connected to the driving unit and a switch control terminal thereof being connected to a second control voltage;
   a second electronic switch with a first connection terminal thereof being connected to a high level, a second connection terminal thereof being connected to a first connection terminal of a third electronic switch, and a switch control terminal thereof being connected to a first control voltage;
   the third electronic switch with a first connection terminal thereof being connected to the second connection terminal of the second electronic switch, a second connection terminal thereof being connected to a capacitance, and a switch control terminal thereof being connected to a scan voltage;
   a fourth electronic switch, with a first connection terminal thereof being connected to the driving unit, a second connection terminal thereof being connected to a data voltage, and a switch control terminal thereof being connected to the scan voltage;
   a fifth electronic switch with a first connection terminal thereof being connected to ground, a second connection terminal thereof being connected to the driving unit, and a switch control terminal thereof being connected to the second control voltage; and
   the capacitance with one terminal thereof being connected to ground, and the other terminal thereof being connected to the second connection terminal of the third electronic switch,
   wherein an anode of the organic light emitting diode is connected to the high level, and
   the second connection terminal of the second electronic switch is connected to the second connection terminal of the first electronic switch.

2. The organic light emitting diode driving circuit according to claim 1, wherein the driving unit is a driving transistor, a control terminal of the driving transistor is connected to the second connection terminal of the third electronic switch, and the two connection terminals of the driving transistor are connected to the second connection terminal of the fifth electronic switch and the second connection terminal of the first electronic switch respectively.

3. The organic light emitting diode driving circuit according to claim 1, wherein at least one of the first electronic switch, the second electronic switch, the third electronic switch, the fourth electronic switch and the fifth electronic switch is an N-type thin film transistor.

4. The organic light emitting diode driving circuit according to claim 2, wherein at least one of the first electronic switch, the second electronic switch, the third electronic switch, the fourth electronic switch and the fifth electronic switch is an N-type thin film transistor.

5. The organic light emitting diode driving circuit according to claim 2, wherein the driving transistor is an N-type thin film transistor.

6. An active organic light emitting diode display panel having an organic light emitting diode driving circuit including an organic light emitting diode, a driving unit controlling a current of the organic light emitting diode and a threshold compensation unit, said threshold compensation unit comprising:
   a first electronic switch, a first connection terminal thereof being connected to a cathode of the organic light emitting diode, a second connection terminal thereof being connected to the driving unit and a switch control terminal thereof being connected to a second control voltage;
   a second electronic switch, a first connection terminal thereof being connected to a high level, a second connection terminal thereof being connected to a first connection terminal of a third electronic switch, and a switch control terminal thereof being connected to a first control voltage;
   the third electronic switch, a first connection terminal thereof being connected to the second connection terminal of the second electronic switch, a second connection terminal thereof being connected to a capacitance, and a switch control terminal thereof being connected to a scan voltage;
   a fourth electronic switch, a first connection terminal thereof being connected to the driving unit, a second connection terminal thereof being connected to a data voltage, and a switch control terminal thereof being connected to the scan voltage;

a fifth electronic switch, a first connection terminal thereof being connected to ground, a second connection terminal thereof being connected to the driving unit, and a switch control terminal thereof being connected to the second control voltage; and the capacitance, one terminal thereof being connected to ground, and the other terminal thereof being connected to the second connection terminal of the third electronic switch, wherein an anode of the organic light emitting diode is connected to the high level, and the second connection terminal of the second electronic switch is connected to the second connection terminal of the first electronic switch.

7. An organic light emitting diode driving method for using an active organic light emitting diode display panel having an organic light emitting diode driving circuit, said organic light emitting diode driving circuit including an organic light emitting diode, a driving unit controlling a current of the organic light emitting diode and a threshold compensation unit, said threshold compensation unit comprising: a first electronic switch with a first connection terminal thereof being connected to a cathode of the organic light emitting diode, a second connection terminal thereof being connected to the driving unit and a switch control terminal thereof being connected to a second control voltage; a second electronic switch with a first connection terminal thereof being connected to a high level, a second connection terminal thereof being connected to a first connection terminal of a third electronic switch, and a switch control terminal thereof being connected to a first control voltage; the third electronic switch with a first connection terminal thereof being connected to the second connection terminal of the second electronic switch, a second connection terminal thereof being connected to a capacitance, and a switch control terminal thereof being connected to a scan voltage; a fourth electronic switch with a first connection terminal thereof being connected to the driving unit, a second connection terminal thereof being connected to a data voltage, and a switch control terminal thereof being connected to the scan voltage; a fifth electronic switch with a first connection terminal thereof being connected to ground, a second connection terminal thereof being connected to the driving unit, and a switch control terminal thereof being connected to the second control voltage; and the capacitance with one terminal thereof being connected to ground, and the other terminal thereof being connected to the second connection terminal of the third electronic switch, an anode of the organic light emitting diode being connected to the high level, and the second connection terminal of the second electronic switch being connected to the second connection terminal of the first electronic switch, said method comprising the steps of:

in a pre-charge phase, the third and the fourth electronic switches being turned on in response to a valid level of the scan voltage, the second electronic switch being turned on in response to the valid voltage of the first control voltage, the first and the fifth electronic switches being turned off in response to an invalid voltage of the second control voltage, and the terminal of the capacitance connected to the third switch transistor being charged to the high level;

in a data writing and discharging compensation phase, the third and the fourth electronic switches being turned on in response to the valid level of the scan voltage, the second electronic switch being turned off in response to the invalid voltage of the first control voltage, the first and the fifth electronic switches being turned off in response to the invalid voltage of the second control voltage, and the capacitance discharging to the valid level value of the data voltage through the driving unit;

in a switch-buffering phase, the third and the fourth electronic switches being turned off in response to the invalid level of the scan voltage, the second electronic switch being turned off in response to the invalid voltage of the first control voltage, and the first and the fifth electronic switches being turned off in response to the invalid voltage of the second control voltage; and in a driving phase for the organic light emitting diode, the first and the fifth electronic switches being turned on in response to the valid voltage of the second control voltage, the third and the fourth electronic switches being turned off in response to the invalid level of the scan voltage, the second electronic switch being turned off in response to the invalid voltage of the first control voltage, a driving current of the driving unit flowing through the organic light emitting diode to cause it to emit light.

8. The organic light emitting diode driving method according to claim 7, wherein the driving unit is a driving transistor, a control terminal of the driving transistor is connected to the second connection terminal of the third electronic switch, and the two connection terminals of the driving transistor are connected to the second connection terminal of the fifth electronic switch and the second connection terminal of the first electronic switch respectively.

9. The organic light emitting diode driving method according to claim 7, wherein at least one of the first electronic switch, the second electronic switch, the third electronic switch, the fourth electronic switch and the fifth electronic switch is an N-type thin film transistor.

10. The organic light emitting diode driving method according to claim 8, wherein at least one of the first electronic switch, the second electronic switch, the third electronic switch, the fourth electronic switch and the fifth electronic switch is an N-type thin film transistor.

11. The organic light emitting diode driving method according to claim 8, wherein the driving transistor is an N-type thin film transistor.

* * * * *